Figure 1:
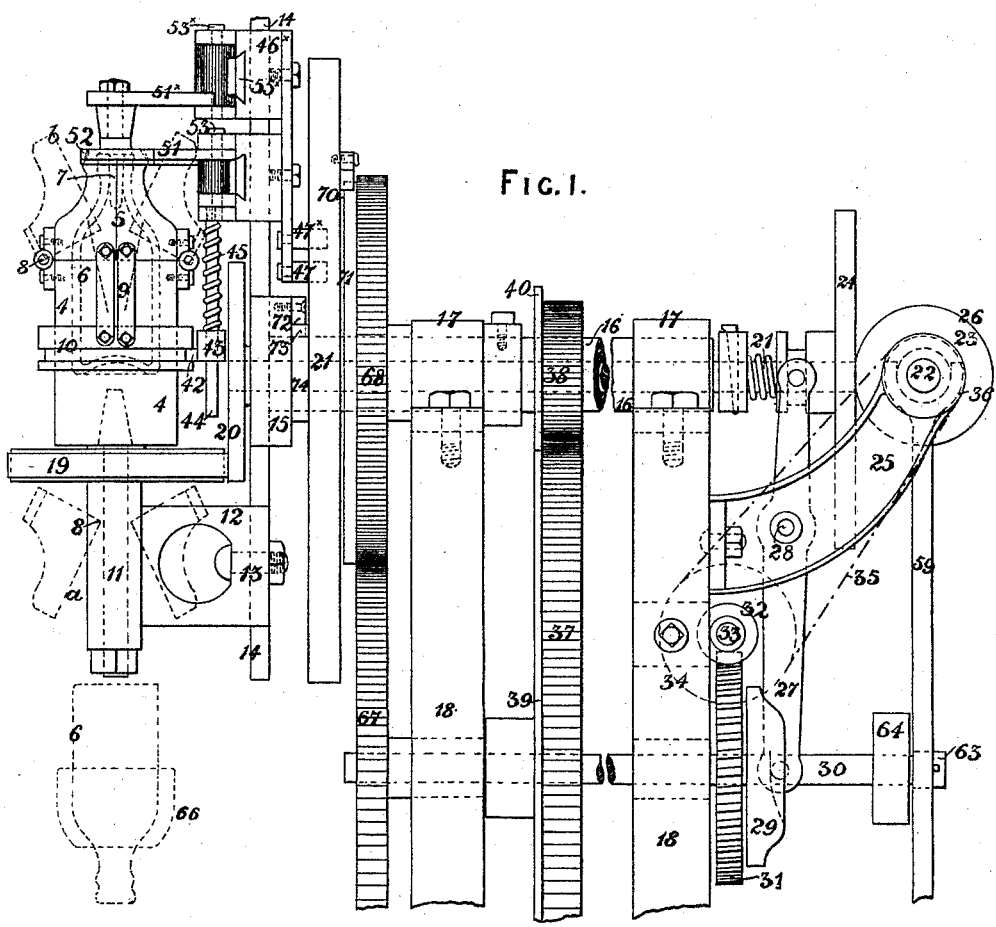

(No Model.) 2 Sheets—Sheet 1.

W. AMBLER.
APPARATUS FOR THE MANUFACTURE OF GLASS BOTTLES.

No. 443,033. Patented Dec. 16, 1890.

WITNESSES.
E. G. Jarvis
B. Bauer

INVENTOR.
William Ambler
by Charles Aubrey Day
Attorney (No Model.) 2 Sheets—Sheet 2.
W. AMBLER.
APPARATUS FOR THE MANUFACTURE OF GLASS BOTTLES.
No. 443,033. Patented Dec. 16, 1890.
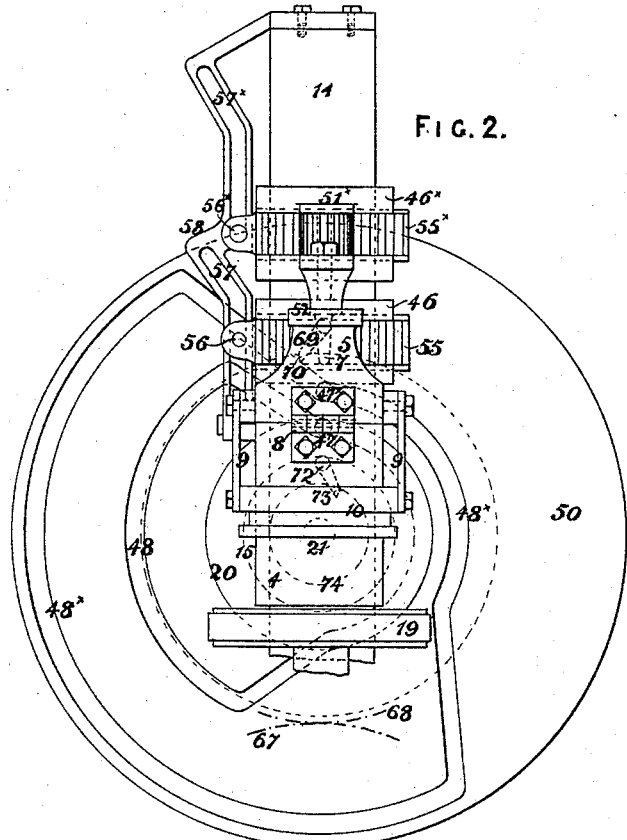
FIG. 2.
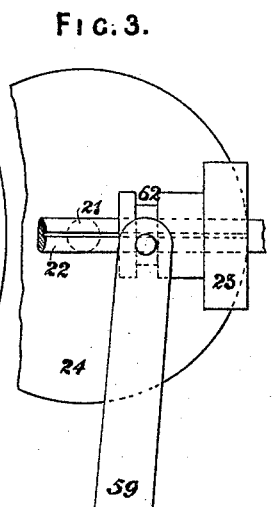
FIG. 3.
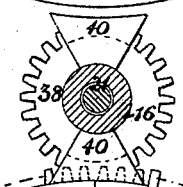
FIG. 4.
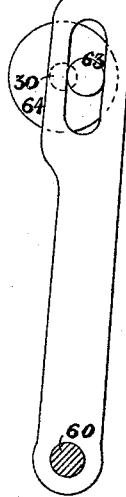
WITNESSES.
E. G. Jarvis
C. Bauer
INVENTOR.
William Ambler
by Charles Aubrey Day
Attorney

UNITED STATES PATENT OFFICE.

WILLIAM AMBLER, OF BRADFORD, ENGLAND, ASSIGNOR OF PART TO JEREMIAH RHODES AND SAMUEL RHODES, OF SAME PLACE.

APPARATUS FOR THE MANUFACTURE OF GLASS BOTTLES.

SPECIFICATION forming part of Letters Patent No. 443,033, dated December 16, 1890.

Application filed January 4, 1889. Serial No. 295,483. (No model.) Patented in England May 4, 1888, No. 6,639; in Belgium December 17, 1888, No. 84,318; in France December 19, 1888, No. 194,830; in Germany December 22, 1888, No. 51,682; in Norway December 28, 1888, No. 1,310; in Sweden December 29, 1888, No. 2,116; in Canada January 14, 1889, No. 30,546, and in Austria-Hungary November 7, 1889, No. 11,875 and No. 51,155.

*To all whom it may concern:*

Be it known that I, WILLIAM AMBLER, commission agent, a subject of the Queen of Great Britain and Ireland, residing at Bradford, Yorkshire, England, have invented certain Improvements in Apparatus for the Manufacture of Glass Bottles, (for which I and Jeremiah Rhodes, organist, and Samuel Rhodes, fine-art dealer, both subjects of the Queen of Great Britain and Ireland, and of Bradford, Yorkshire, England, have applied for and obtained Letters Patent in England, No. 6,639, dated May 4, 1888; in Germany, No. 51,682, dated December 19, 1888; in Austria-Hungary, No. 11,875 and No. 51,155, dated November 7, 1889; in Belgium, No. 84,318, dated December 17, 1888; in Canada, No. 30,546, dated January 14, 1889; in Sweden, No. 2,116, dated December 29, 1888, and in Norway, No. 1,310, dated December 26, 1888,) of which the following is a specification.

This invention relates to certain improvements in or applicable to the manufacture of glass bottles; and it consists, essentially, in means for molding molten glass by centrifugal agency caused to operate circumferentially around the axis of the bottle, preferably in a horizontal plane, and also endwise thereof in a plane at right angles to that of its first-referred-to movement of rotation, and for distributing the metal about the bottom, body, shoulder, and neck of the bottle into the required form of bottle in a correspondingly-formed mold adapted or combined with automatically opening and closing motions, allowing of the molten glass being inserted thereinto, of its being inclosed during the formation of the bottle, and of the formed bottle falling or being withdrawn therefrom, and with automatically-operated means for rotating it about its axis for as long as may be required to distribute the molten glass (dropped into and onto the bottom of the mold while open and stationary) circumferentially and evenly within the same, so as also to form the side or body part and shoulder of the bottle, and also with automatically-operated means for simultaneously or during a portion of such time rotating it endwise of its axis or in a direction in which its axis will radiate in a plane at right angles to that of its movement of rotation around its axis, causing it to be carried round (while still rotating as aforesaid around its axis) for as long as may be required to distribute the metal into and around the neck of the mold, so as to form such part of the bottle, these motions or such of them as may be necessary being continued until the glass has sufficiently cooled, hardened, or set as to allow of the bottle falling or being removed from the mold without liability of injury to its form, the molten glass inserted into the mold being thus caused by such combined motions imparted thereto to be distributed within all parts of the mold and to be formed into a bottle of the form thereof.

On the accompanying drawings, Figure 1 is a side elevation of an arrangement of apparatus embodying the said invention. Fig. 2 is a front elevation of part of such apparatus. Fig. 3 is an end view of means of imparting a differential speed of rotation to the mold in a horizontal plane. Fig. 4 is an end view of means of intermittently actuating the mold in a vertical plane.

4 represents the mold, which is formed of cast-iron or other suitable metal in bottom and top parts 4 5, the former of which is cylindrical or of the required internal form and dimensions of those of the exterior of the body part and bottom of the bottle 6 and the latter of which is made in half parts of the required internal form and dimensions of those of the exterior of the shoulder and neck parts of the bottle, the mouth part of the bottle being also formed by such half parts 5 of the mold acting conjointly with a suitably-shaped removable plug 7, the operation of which is hereinafter described.

The parts 5 of the mold are hinged to the part 4 thereof, as at 8, and are also linked, as at 9, to a collar 10, surrounding the mold 4, and operated as hereinafter described, the operation thereof being effective in causing the parts 5 of the mold to be opened, as indicated by the dotted lines at $a$, when the neck of the mold occupies a downward direction to permit of the bottle falling thereout or being removed from the mold, and to continue open until the neck of the mold is caused to assume an upward direction, (vide the dotted lines at $b$,) so as to permit of sufficient of the molten glass to form the desired bottle being inserted by the ladles, hereinafter described, or in any other suitable manner into the mold onto the bottom thereof, immediately after which the mold is successively and automatically closed, clamped, rotated about its axis and also endwise thereof, as and as long as aforesaid, the neck of the mold again occupying a downward direction at the completion of the operation, and being then again opened to release the formed bottle, and so on.

The mold 4 is screwed on or otherwise firmly secured to a spindle 11, which is supported by a bracket 12, bolted, as at 13, to a carrying-plate 14, projecting from or secured to a head 15, keyed on a tubular shaft 16, which is supported in bearings 17, bolted to the framing 18 of the machine, and is intermittently operated, as hereinafter described, for causing the rotation of the mold in a vertical plane. The spindle 11 is also fitted with a friction-pulley 19, keyed thereon, and which is intermittently rotated in such a manner as to cause the aforesaid rotation of the mold about its axis in a horizontal plane by a friction-disk 20, fast on a shaft 21, working within the shaft 16. The shaft 21 is differentially rotated from the motor-shaft 22 by means of a friction-wheel 23, keyed on the latter with facility of sliding endwise thereon, engaging with a friction-disk 24, keyed on the shaft 21. The shaft 22 is supported in brackets 25, and is operated at the required speed by a belt passing round a pulley 26, fast thereon. The reciprocating endwise movement of the friction-wheel 23 along the shaft 22 is caused by means of a lever 59, (vide Fig. 3,) which is centered at 60 to the framing 18 and is formed with a fork 61, engaging with a clutch-groove 62, with which the hub of the wheel 23 is formed, the lever being rocked by a shaft 30, hereinafter referred to, by means of an eccentric-pin 63, projecting from a hub 64, keyed on such shaft.

The object of causing the mold to receive a differential speed of rotation is that while the body of the bottle is being formed when the molten glass has to be distributed over a greater area it may be more quickly rotated, and that when upon the mold being inverted part of the molten glass descends into the neck thereof, and while forming the neck of the bottle and while the mold is being kept rotating during the setting of the glass and completion of the formation of the bottle the mold may be more and more slowly rotated, as the continuation of the rotation is then only required to prevent the soft glass from collapsing.

The friction-wheel 23 and disk 24 are intermittently put into and out of gear by means of a lever 27, centered at 28 and operated by a cam 29, keyed on the shaft 30, to which a continuous slow motion is imparted by a worm-wheel 31, keyed thereon and actuated by a worm 32 on a shaft 33, on which is keyed a pulley 34, which is actuated by a connecting-strap 35 from a pulley 36 on the shaft 22.

The shaft 16 is intermittently rotated (comparatively slowly relatively to the speed of rotation of the mold around its axis) by means of a continuously-toothed wheel 37, keyed on the shaft 30, and an interruptedly-toothed wheel 38, keyed on the shaft 16, such wheels being respectively formed or fitted with a locking-rim 39 and with one or more locking-plates 40. (Vide Fig. 4.) The locking-rim 39 is recessed at 65 to permit of the rotation of the locking-plates 40, when required, and is also formed with one or more projecting teeth 41, which as the wheel 37 rotates by striking the locking-plate 40 at the moment it is unlocked by the rim 39 causes the engagement of the toothed portion of the wheel 38 with the toothed rim of the wheel 37, by which the shaft 16 is thus rotated until the following locking-plate 40 is locked by the rim 39. By the rotation thus imparted to the shaft 16 (to which, as aforesaid, the plate 14, carrying the mold, is made fast) the mold is reversed in position, which causes the molten glass to enter the neck thereof while still rotating about its axis and to form the neck of the bottle. As represented on the annexed drawings, the said locking-plates 40, rim 39, gearing 37 38, teeth 41, and recesses 65 are so arranged as to impart one-half a revolution to the plate 14 and mold; but they may be so arranged as to give one and a half, two and a half, or more revolutions thereto. It is preferred, but not essential, that the mold should finish its rotation at the half of one or more revolutions, as the mold when pointing downward and when opened offers facilities for the bottle falling into an appropriately-shaped and suitably-supported cup 66, (vide Fig. 1,) from which it is removed by an attendant to the annealing-kiln.

The aforesaid operations of opening and closing the mold to admit, respectively, of the molten glass being inserted into the mold while its open neck parts 5 are pointing upwardly, and of the formed bottle falling thereout or being removed therefrom while its open neck parts are pointing downwardly, and of inclosing the molten glass during the formation of the bottle are effected by means of the links 9 and collar 10, the latter of which is operated by a spur 42 on a sleeve 43, sliding on a rod 44, and is actuated in closing the jaws of the mold by a spring 45, bearing against a slide-bar 46, which carries the rod 44 and slides on an extension of the plate 14. The movements of the slide-bar 46 are caused to be effected as the plate 14 is rotated about the axis of the shaft 16 by means of a pin 47, projecting from the bar 46 and engaging with a cam-groove 48 in a plate 50, and such movements are caused to be effective in clamping and releasing the jaws of the mold as and at the times required by means of an arm 51, carrying a clamping-ring 52, such arm being centered on a pin 53, carried by the slide-bar 46 and keyed to a pinion 54, which is caused to be partially rotated during the movement of the slide-piece by means of a racked slide-bar 55, carried by the bar 46 and moved endwise by a pin 56 thereof entering a cam-slot 57 in a laterally-projecting bracket 58. Lateral movement is by such means imparted to the clamping-ring, in order that it may be removed laterally from above and from under the jaws when removed endwise away therefrom, so as to permit of free access to the mold when open, for the purposes aforesaid. Similar endwise and lateral movements are imparted to the plug 7, which is caused to be inserted into the neck of the mold immediately the clamping-ring has been lowered thereabout, and to be removed therefrom immediately before the clamping-ring is removed, and such motions are effected by similar means, $46^\times$, $47^\times$, $48^\times$, $51^\times$, $53^\times$, $54^\times$, $55^\times$, $56^\times$, and $57^\times$, to those hereinbefore described with reference to the clamping-ring. As the plug is lowered into the neck of the closed and clamped mold containing the molten glass it closes the aperture of the neck thereof. Its rotation around its axis then commences, the succeeding operations automatically following, as hereinbefore described.

69 represents a pawl carried by the cam-plate 50 and engaging with a notch 70, formed on the rim 71 of a toothed wheel 68, which revolves around the shaft 16, and is driven from the shaft 30 by a toothed wheel 67, and 72 represents a like pawl carried by the head 15, fast on the shaft 16 and engaging with a notch 73, formed in the hub 74 of the plate 50, which also can revolve around the shaft 16. At the time, hereinbefore referred to, when the mold-carrying plate 14 is actuated by the rotation of the shaft 16 the catch 72 causes the cam-plate 50 to be carried round the pawl 69, sliding over the rim 71 of the wheel 68. The plate 14 travels more quickly than the wheel 68. Consequently when the plate 14 has completed its rotation the cam-plate 50 remains stationary until the pawl 69 is again engaged. Such an arrangement of apparatus may be duplicated to any required extent, in which case a series of molds and their necessary attachments may be arranged side by side and actuated by a common cross-shaft, or two or more of the molds may be arranged on one carrying-plate, so that as one mold is filled and goes into operation the other rises empty and ready to go into operation.

At each operation of filling the mold the required amount of molten glass to form the intended bottle is ordinarily placed in the mold by means of ladles. The molten glass may, however, be placed in the mold by any other suitable means.

I claim—

1. In apparatus for molding glass bottles from molten glass by centrifugal force, in combination, an opening and closing mold, means for automatically opening, closing, clamping, and stopping the mold, means for automatically rotating the mold about its axis, and means for automatically rotating the mold in a path in which its axis will radiate.

2. In apparatus for molding glass bottles from molten glass by centrifugal force, in combination, an opening and closing mold and means for automatically opening, closing, clamping, and stopping the mold.

3. In combination with the hinged parts 5 of the mold, the links 9, collar 10, clutch 43, rod 44, spring 45, slide-bar 46, guide-plate 14, pin 47, and grooved cam-plates 48 50, operating to open and close the mold, as set forth.

4. In combination with the hinged parts 5 of the mold, the clamping-ring 52, arm 51, pin 53, pinion 54, racked slide-bar 55, pin 56, slotted bracket 57, slide-bar 46, guide-plate 14, pin 47, and grooved cam-plates 48 50, operating to clamp and release the mold, as set forth.

5. In combination with the hinged parts 5 of the mold, the plug 7, arm $51^\times$, pin $53^\times$, pinion $54^\times$, racked slide-bar $55^\times$, pin $56^\times$, slotted bracket $57^\times$, slide-bar $46^\times$, guide-plate 14, pin $47^\times$, and grooved cam-plates $48^\times$ 50, operating to close the mouth of the mold, as set forth.

6. In combination with the mold 4, the supported spindle 11, friction-wheel 19, friction-disk 20, shaft 21, friction-disk 24, friction-wheel 23, lever 27, cam 29, operating to put the friction-disk 24 and wheel 23 intermittently into and out of frictional contact, lever 59, and eccentric-pin 63, operating to cause disk 24 to receive a differential speed of rotation from the wheel 23, the whole operating to intermittently rotate the mold around its axis, as set forth.

7. In combination with the mold 4, the spindle 11, bracket 12, plate 14, head 15, shaft 16, gearing 38 37, with the locking-rim 39, lock-plates 40, and projecting teeth 41, operating to intermittently carry around the rotating mold in a direction in which its axis will radiate, as set forth.

8. In combination, the shaft 16, head 15, pawl 72, cams 74 50, pawl 69, and gearing 67 68, operating to intermittently rotate the cam-plate.

In witness whereof I hereunto set my hand in presence of two witnesses.

WILLIAM AMBLER.

Witnesses:
GEORGE EDWARD MUMFORD,
SAMUEL EDWARD DEAN.